United States Patent [19]

Curry

[11] 4,011,291

[45] Mar. 8, 1977

[54] APPARATUS AND METHOD OF MANUFACTURE OF ARTICLES CONTAINING CONTROLLED AMOUNTS OF BINDER

[75] Inventor: James D. Curry, St. Joseph, Mich.

[73] Assignee: Leco Corporation, St. Joseph, Mich.

[22] Filed: Sept. 2, 1975

[21] Appl. No.: 609,493

Related U.S. Application Data

[63] Continuation of Ser. No. 408,821, Oct. 23, 1973, abandoned.

[52] U.S. Cl. .................................. 264/43; 75/211; 264/56; 264/86; 264/328

[51] Int. Cl.² ......................................... B29D 27/04

[58] Field of Search ............... 264/59, 86, 63, 328, 264/111, 56, 327, 337, 41, 43; 75/211; 106/55

[56] References Cited

UNITED STATES PATENTS

| 3,285,873 | 9/1966 | Bailey | 264/328 |
| 3,351,688 | 9/1967 | Kingery | 264/63 |

FOREIGN PATENTS OR APPLICATIONS 216,064   9/1957   Australia .............................. 264/86

Primary Examiner—Robert F. White
Assistant Examiner—John Parrish
Attorney, Agent, or Firm—Price, Heneveld, Huizenga & Cooper

[57] ABSTRACT

A method of forming articles containing a controlled amount of binder, i.e., a presintered ceramic article, utilizes mixing of base materials with a meltable binder such as paraffin wax. The mixture is then formed, as a slurry, into the configuration of the article and is allowed to solidify. The solidified mixture is then packed into a binder-absorptive material and controllably heated above the melting point of the binder but below the vaporization point of the binder. The excess binder in the material is drawn from the solidified mixture by wicking action. Subsequently, if the mixture is to form a sintered ceramic article, the solidified mixture is fired to a desired property.

13 Claims, 1 Drawing Figure

APPARATUS AND METHOD OF MANUFACTURE OF ARTICLES CONTAINING CONTROLLED AMOUNTS OF BINDER This is a continuation of application Ser. No. 408,821, filed Oct. 23, 1973, now abandoned.

BACKGROUND OF THE INVENTION

I. Field of the Invention

The method and apparatus for forming articles containing controlled amounts of binder of this invention is found in U.S. Patent Office Manual of Classification, Class No. 264, Subclass 41, which relates to pore forming in situ.

II. Description of the Prior Art

When forming articles containing controlled amounts of binder, it is customary to only include initially the desired amount of binder. Occasionally, this may not be suitable manner for making some articles.

For instance, simple ceramic articles are usually formed by dry pressing, casting, extruding, or soft mud molding. Once the desired shape is formed, this unfired (green) ware is usually dried and fired to a temperature which will produce the desired porosity and strength in the ceramic piece. With dry pressing, it is difficult to obtain uniform density throughout the formed piece and intricate shapes cannot be formed without machining the unfired or fired ware. Extrusion and soft mud methods are even more limited in the shapes which can be formed.

Casting utilizes a slurry of ceramic and water which can be poured into a mold of the desired shape. Intricate shapes can be formed by casting, but thick-walled articles require a great amount of time to dry before firing and significant density variations can exist. With any of the methods described, it is difficult to control precise dimensions and density of the fired article.

More recent prior art methods for forming more complex-shaped articles are found in U.S. Pat. No. 3,351,688 to Kingery which issued on Nov. 7, 1967, and is entitled PROCESS OF CASTING REFRACTORY MATERIALS, and U.S. Pat. No. 3,416,905 to Waugh which issued on Dec. 17, 1968, and is entitled PROCESS FOR MANUFACTURE OF POROUS ABRASIVE ARTICLES.

U.S. Pat. No. 3,351,688 teaches a method of casting refractory materials by forming the articles in a green state from a slurry of refractory materials, a meltable binder, and a suspending agent. The piece is formed in a liquid state, allowed to solidify, and is then heated to vaporize the binder. The piece is then fired in its final configuration to a desired density. U.S. Pat. No. 3,416,905 teaches a similar process except that the fluid mixture formed comprises abrasive particles, glass frit, and a suspending agent in a meltable binder. The mixture is poured or injection molded onto an article, is allowed to solidify, is heated to vaporize the binder, and subsequently fired forming a porous abrasive article. The glass frit vitreously bonds the abrasive material into the final product.

In use of a meltable binder in forming articles, it has been the practice of those skilled in the art to heat the article being formed to a temperature sufficient to drive the binder from the article as vapor.

Although these uses of a meltable binder represent an improvement over the prior art, particularly for forming intricately shaped articles, vaporization of the binder from the articles has limited the size of the article which may thusly be manufactured. If the article wall thickness is greater than about one-half of an inch, cracking, scaling, and other matrix imperfections can result in the structure during vaporization of the binder. Further, if it is desired to closely control the amount of binder in the article, vaporization of the binder does not allow a regulated discharge of the binder.

Also, the internal pressure caused by the vaporization process can be great enough to produce laminations or internal voids in the article. Thus, if the structure being formed by these prior art methods requires certain porosity and density characteristics and close control of binder amounts present, e.g., thick-walled refractories, the structure thus formed may not be satisfactory.

SUMMARY OF THE INVENTION

The present invention is a method and apparatus for forming articles of predetermined form which have controlled dimensions and controlled amounts of binder present and may have intricate shapes without machining. The articles may be relatively thick walled, e.g., greater than ½ inch thick, and have controlled physical properties. In this method and apparatus, base materials with a meltable binder are formed as a slurry into an article, and allowed to solidify. The solidified mixture is packed into a binder-absorptive material and is controllably elevated to a temperature above that of the melting point of the binder but below the vaporization temperature of the binder. The binder is drawn from the solidified mixture into the binder-absorptive material by wicking action until the desired amount of binder remains in the article.

DESCRIPTION OF THE PREFERRED EMBODIMENT

Figure 1:
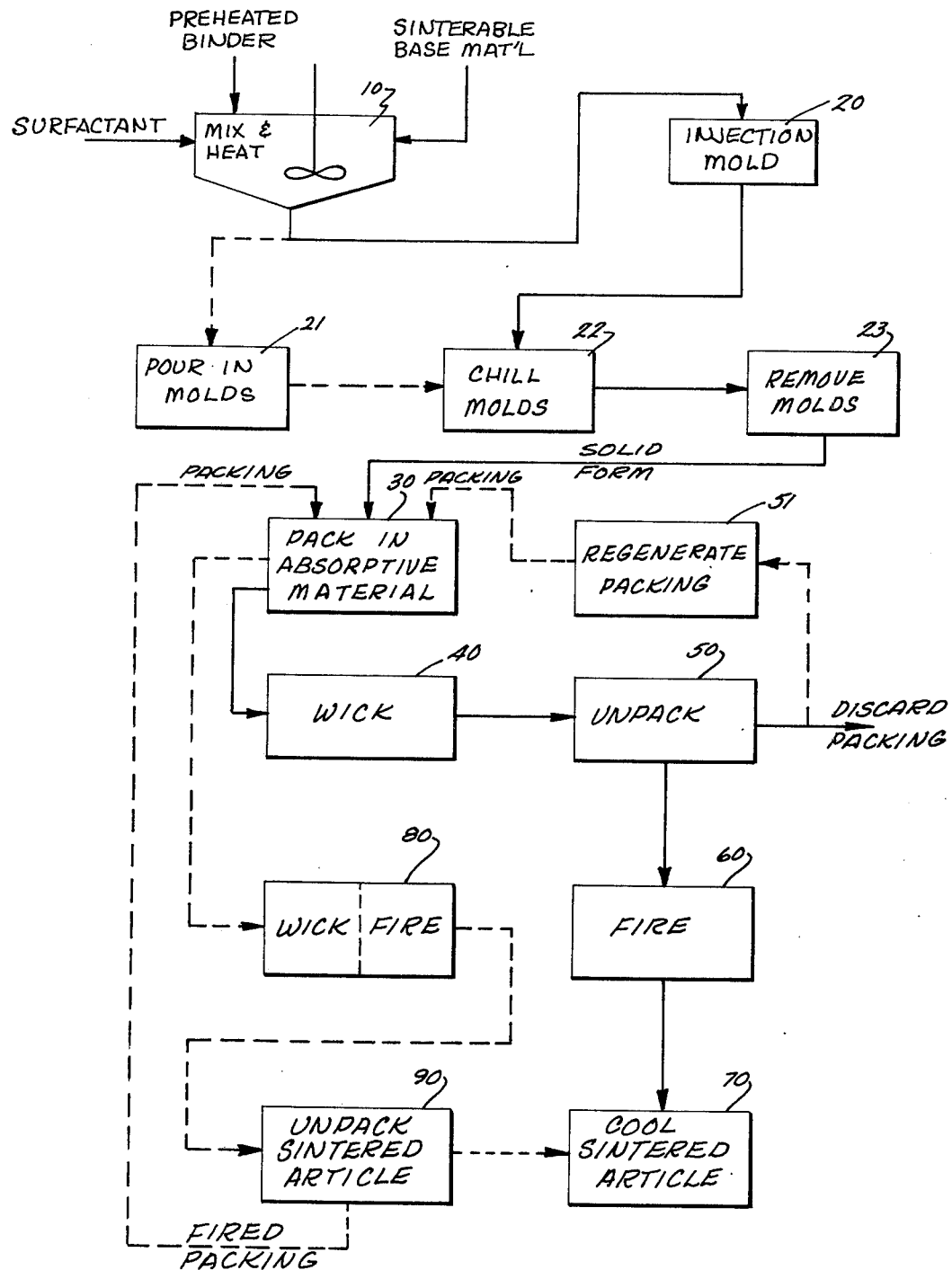
FIG. 1 is a schematic drawing of the method and apparatus forming articles containing controlled amounts of binder.

Referring to the drawing, base materials, binder, and a surfactant are mixed and heated at 10 to form a liquid mixture. After molding and cooling at 20, the mixture as a solid configuration of the article being formed is packed in a binder-absorptive material at 30. By raising the temperature of the article above the melting point of the binder but below the vaporization temperature of the binder, the article is wicked at 40 until it contains a desired amount of binder.

More specifically, at 10 a meltable binder is heated and mixed with a base material and a surfactant to a homogeneous liquid state. As shown at 10, the binder is preferably preheated before being added to the base material, so that the time required for the mixture to reach a liquid phase is reduced.

The base material useable in this invention is any material capable of forming a slurry with a meltable binder and which as a slurry, will form a relatively stable configuration upon being solidified. The base material may be in a variety of particle sizes ranging from coarse to relatively fine powders. Suitable base materials include ceramic materials, powdered metals that are heat bondable, and/or precursors of these. Preferred ceramic materials include fused silica, alumina, magnesia, zirconium, zircon, spinels, mullite, glass frits, tungsten and silicon carbides, boron and silicon nitrides, and combinations of these. Powdered metals include graphite, tungsten, silicon, iron, and aluminum. The meltable binder is preferably any material which in a solidified state will act to suspend a base material in a homogeneous dispersion. The binder must have a melting point temperature less than the temperature at which the base material is nondesirably heat altered. Preferred binders include waxes, particularly paraffins and silicones.

If desired, a surfactant may be incorporated so as to provide desired rheological properties to the slurry. Particularly useful surfactants for paraffinic waxes include fatty acids, i.e., oleic acid, and oleophillic sulfonates.

After adequately heating and mixing of the binder, surfactant, and base material at 10, the liquid is formed into the configuration of the article either by injection molding 20 or pouring into molds 21. The molds are cooled so that the base material remains homogeneously dispersed in the binder forming a solidified mixture (or if the article is being formed as a ceramic, a green [unfired] piece) at 22. At 23, the mold is removed from the solidified mixture. At 30, the solidified mixture is packed in a binder-absorptive material.

The binder-absorptive material must have a melting point at least greater than the melting point of the binder and must be compatible enough with the binder when the binder is in a liquid state to absorb the liquid binder. Organic, i.e., polyurethane foam, and inorganic materials, i.e., ceramic powders, may be used with the above-described wax binders. The absorptive material must be nonreactive and chemically stable with the meltable binder and have a sufficiently small particle size so as to not cause imperfections when contacting the solidified mixture. In the practice of this invention, the absorptive material has preferably been inorganic to reduce the material costs for such materials. Useful inorganic absorptive materials include clay materials, fused silica, alumina, zircons, zirconia, and diatomaceous earth. These materials, of course, may have relatively high impurity levels as compared to the base material. When packing the solidified mixture in the absorptive material, it has been found desirable to tamp the packing material to provide good contact of the material with the solidified mixture.

At 40, the solidified mixture, packed in the absorptive material, is placed in a dewaxing oven or kiln and its temperature is raised above the melting point of the meltable binder but below the vaporization temperature of the binder. The article is maintained in this temperature range until the desired amount of binder is removed by the wicking action of the absorptive material on the meltable binder in the article. The vaporization temperature of the binder is that temperature at which the binder is driven off as a gas from the base material rather than being transferred as a liquid mass. It is recognized that the binder even as it is being drawn from the mixture as a liquid inherently gives off an insignificant amount of vapor. However, the amount of vapor formed is minimized so as to not interfere with the transfer of the binder as a liquid from the mixture.

Wicking involves transfer of the binder in its liquid state from the mixture into the absorptive material. The material acts to collect the liquid binder from the surface of the solidified mixture. In the wicking action, the binder is removed from the solidified mixture by liquid transfer through the interstices of the base material and into the absorptive material.

When the desired amount of binder is removed from the article at 50, the article is unpacked from the absorptive material. Because of the availability of inexpensive inorganic absorptive material, the binder containing absorptive material may be discarded or as shown at 51 may be regenerated and recycled to 30 for reuse.

If as shown, the article is a ceramic, the unpacked green piece at 60 is then fired at a sintering temperature until the desired porosity is attained.

As shown in FIG. 1, when a sintered ceramic article is being formed, if an absorptive material is utilized which has a melting point above the firing temperature of the base materials, as shown at 80, the green piece may be wicked and fired without unpacking of the green piece from the absorptive material. This alternative embodiment may be used when it is desired to not unpack the green piece after wicking and further allows the wicking and firing process to be accomplished in one furnace or kiln. During firing of the green piece, the residual meltable binder will be vaporized from the absorptive material. Thus, as shown at 90, after unpacking the fired article, the packing may be recycled back to 30 for reuse. The fired article is then allowed to cool at 70.

It is apparent, particularly for thick-walled articles, that several wicking steps may be utilized. Further, when forming a sintered ceramic article, the above method and apparatus permits a selection of a wide range of sinterable base materials, and close control of the number and size of voids in the final sintered article based upon the amounts and sizes of various constituents in the mixture which is formed into the green piece and eventually fired into the ceramic article.

EXAMPLE

One hundred pounds of fused silica consisting of a mixture of coarse and fine grained material is mixed with 11.3 pounds of paraffin wax and 0.9 pounds of oleic acid. The solid materials are added to the melted paraffin and oleic acid in any controlled sequence. The temperature of the mixture is raised above the melting point (140° F.) to a temperature which allows a good wax viscosity for mixing (approximately 200° F.). The mixture is thoroughly agitated under a vacuum of 25 inches of mercury until a fluid homogeneous mixture is obtained. The slurry is then injection molded at about 80 psi into an aluminum mold. The mixture is then solidified by the cool die to form the green piece.

The green piece is removed from the mold when the temperature of the formed piece is sufficiently below the melting point to allow handling without causing defects. The green piece is then placed in a container and the container is packed with fused silica. The container is sufficiently larger than the piece to allow the binder-absorptive packing material to cover the piece on all sides relatively uniformly. The container with the ware is placed in a furnace which has a temperature of 180° to 250° F. The container (with green piece) is allowed to soak until approximately 45 to 65 per cent of the total organics have been removed from the green piece. The piece is then fired to 2,100° F., and held at this temperature for several hours and allowed to cool. The final apparent porosity of the article is approximately 18 per cent.

It will be understood that various changes in the details, materials, steps, and arrangements of parts herein described may be made by those skilled in the art and will fall within the principle and the scope of the invention as defined by the appended claims.

The embodiments of the invention in which an exclusive property or privilege is claimed are defined as follows.

1. In a method of forming ceramic products containing a controlled amount of meltable binder comprising forming a mixture of a melted meltable wax binder which is solid at room temperature and ceramic forming base materials into a solid article of desired configuration by allowing said mixture to solidify in a mold, the improvement in said method comprising the steps of:

packing said article into a binder-absorptive material for absorbing said binder when it is converted to a liquid state wherein said binder has a melting point less than the temperature at which said base material is undesirably heat altered and wherein said binder absorptive material has a melting point greater than the melting point of the binder, is non-reactive with said binder, and has a sufficiently small particle size so as to not yield imperfections when contacting the solidified mixture and elevating and maintaining the temperature of said article above the melting point of the meltable binder but below the vaporization temperature of said binder causing said binder to become liquid and allowing said binder to be drawn from said article into said binder-absorptive material by a wicking action until at least 45% of said binder is wicked out of said article and into said binder absorptive material; and thereafter firing said article in a kiln to produce a ceramic product.

2. The method of claim 1 in which said step of forming said article comprises:

forming a relatively thick walled article having a wall thickness of at least ½ inch; said step of elevating and maintaining the temperature of said article above the melting point of the meltable binder and below the vaporization temperature thereof is conducted until at least about 65% of said binder is wicked out of said article and into said binder absorptive material; and said method includes removing said article from said binder absorptive material after said wicking of at least about 65% of said binder out of said article and thereafter performing said firing step.

3. In a method of forming metal products containing a controlled amount of binder comprising forming a mixture of a melted meltable wax binder which is solid at room temperature and metal forming base materials into a solid article of desired configuration by allowing said mixture to solidify in a mold, the improvement in said method comprising the steps of:

packing said article into a binder-absorptive material for absorbing said binder when it is converted to a liquid state wherein said binder has a melting point less than the temperature at which said base material is undesirably heat altered and wherein said binder absorptive material has a melting point greater than that of the binder, is non-reactive with said binder, and has a sufficiently small particle size so as to not yield imperfections when contacting the solidified mixture; and elevating and maintaining the temperature of said article above the melting point of the meltable binder but below the vaporization temperatures of said binder, causing said binder to be drawn from said article into said binder absorptive material by wicking action until at least 45% of said binder is wicked out of said article and into said binder absorptive material; and thereafter firing said article in a kiln to produce a metal product.

4. The method of claim 2 wherein said meltable binder is a paraffinic wax.

5. The method of claim 2 wherein said base material and said meltable binder are mixed in the presence of a surfactant and under a vacuum.

6. The method of claim 2 wherein said forming step comprises low pressure injection molding.

7. The method of claim 2 wherein said binder-absorptive material consists essentially of granular, inorganic solids, said solids having a melting point greater than the sintering temperature of said ceramic base material.

8. The method of claim 1 which further comprises unpacking said article from said binder-absorptive material prior to said firing step and after said step of elevating and maintaining the temperature above the melting point of said binder and below the vaporization temperature thereof; regenerating said binder-absorptive material after removal of said article by heating said binder-absorptive material to a temperature greater than the temperature at which said binder will volatilize; and recycling said regenerated binder-absorptive material as a source of binder-absorptive material for repeating the method on subsequent ones of said article.

9. A method of forming sintered ceramic products of predetermined form comprising batching a mixture of a granular ceramic material capable of being sintered with a melted paraffinic wax binder and a surfactant and casting said mixture into a solid green piece, the improvement in said method comprising:

closely packing said green piece into a paraffinic wax absorptive material wherein said binder has a melting point less than the temperature at which said base material is undesirably heat altered and wherein said binder absorptive material has a melting point greater than the melting point of the binder, is non-reactive with said binder, and has a sufficiently small particle size so as to not yield imperfections when contacting the solidified mixture for drawing liquid paraffinic wax from said green piece; and below the vaporization temperature of said paraffinic wax binder for a period of time to allow at least about 45% to 65% of said paraffinic wax binder in its liquid state to be drawn from said green piece into said absorptive material by a wicking action; and removing said green piece from said absorptive material and firing said green piece.

10. The method of claim 1 in which said step of elevating and maintaining the temperature of said article above the melting point of the meltable binder and below the vaporization temperature thereof is conducted until at least about 65% of said binder is wicked out of said article and into said binder-absorptive material.

11. The method of claim 1 in which said article is removed from said binder-absorptive material after said wicking of at least about 45% of said binder out of said article, and thereafter performing said firing step.

12. The method of claim 1 wherein said wax binder is paraffinic wax.

13. The method of claim 12 wherein said binder-absorptive material consists essentially of particles of inorganic solids, said solids having a melting point greater than the sintering temperature of said ceramic base material.

* * * * *

UNITED STATES PATENT AND TRADEMARK OFFICE
CERTIFICATE OF CORRECTION

PATENT NO. : 4,011,291

DATED : March 8, 1977

INVENTOR(S) : James D. Curry

It is certified that error appears in the above-identified patent and that said Letters Patent are hereby corrected as shown below:

Column 6, line 43:

After "green piece;" insert the following paragraph ---elevating and maintaining the temperature of said green piece above the melting point of said paraffinic wax binder---.

Signed and Sealed this

Seventh Day of June 1977

[SEAL]

Attest:

RUTH C. MASON
*Attesting Officer*

C. MARSHALL DANN
*Commissioner of Patents and Trademarks*